United States Patent
Grainger et al.

(10) Patent No.: US 10,294,433 B2
(45) Date of Patent: May 21, 2019

(54) GAS CONDITIONING PROCESS AND SYSTEM FOR EXTRACTING A CONDENSABLE VAPOUR FROM A SUPPLIED GAS

(71) Applicant: Sage & Time LLP, Greater London (GB)

(72) Inventors: John Grainger, Greater London (GB); Geoff Smith, Greater London (GB)

(73) Assignee: Sage & Time LLP, London (GB)

( * ) Notice: Subject to any disclaimer, the term of this patent is extended or adjusted under 35 U.S.C. 154(b) by 0 days.

(21) Appl. No.: 15/572,603

(22) PCT Filed: Jul. 15, 2016

(86) PCT No.: PCT/GB2016/052163
§ 371 (c)(1),
(2) Date: Nov. 8, 2017

(87) PCT Pub. No.: WO2017/013412
PCT Pub. Date: Jan. 26, 2017

(65) Prior Publication Data
US 2018/0100108 A1    Apr. 12, 2018

(30) Foreign Application Priority Data

Jul. 17, 2015 (GB) .................................. 1512590.9

(51) Int. Cl.
*F28B 1/00*        (2006.01)
*F28B 7/00*        (2006.01)
(Continued)

(52) U.S. Cl.
CPC ........... *C10G 70/043* (2013.01); *B01D 5/009* (2013.01); *C10K 1/046* (2013.01); *C10L 3/101* (2013.01);
(Continued)

(58) Field of Classification Search
None
See application file for complete search history.

(56) References Cited

U.S. PATENT DOCUMENTS 3,523,405 A    8/1970  Knapp et al.
4,101,412 A    7/1978  Choi et al.
(Continued)

FOREIGN PATENT DOCUMENTS

GB      2012940         8/1979
KR      20110137977     12/2011
(Continued)

OTHER PUBLICATIONS

International Patent Application No. PCT/GB2016/052163, Search Report and Written Opinion, dated Nov. 7, 2016.

*Primary Examiner* — Tam M Nguyen
(74) *Attorney, Agent, or Firm* — Kilpatrick Townsend & Stockton LLP; Dean W. Russell

(57) ABSTRACT

A process for extracting a condensable vapor from a supplied gas, comprising the steps of: i) condensing the condensable vapor by cooling the supplied gas at a condensing surface, such that the supplied gas is divided into at least one condensed fraction and a product gas; while ii) removing the at least one condensed fraction from the condensing surface by mechanical scraping means.

28 Claims, 7 Drawing Sheets

(51) Int. Cl.

| | |
|---|---|
| *C10G 70/04* | (2006.01) |
| *C10L 3/10* | (2006.01) |
| *C10K 1/04* | (2006.01) |
| *F28F 19/00* | (2006.01) |
| *F28G 3/12* | (2006.01) |
| *F28D 1/06* | (2006.01) |
| *F28D 7/06* | (2006.01) |
| *F28D 7/16* | (2006.01) |
| *F28F 1/36* | (2006.01) |
| *B01D 5/00* | (2006.01) |
| *F28B 9/08* | (2006.01) |
| *F28B 11/00* | (2006.01) |
| *F28F 13/18* | (2006.01) |
| *F28F 9/22* | (2006.01) |

(52) U.S. Cl.
CPC .................. *F28B 1/00* (2013.01); *F28B 7/00* (2013.01); *F28B 9/08* (2013.01); *F28B 11/00* (2013.01); *F28D 1/06* (2013.01); *F28D 7/06* (2013.01); *F28D 7/16* (2013.01); *F28F 1/36* (2013.01); *F28F 13/182* (2013.01); *F28F 19/008* (2013.01); *F28G 3/12* (2013.01); *C10G 2300/4006* (2013.01); *F28F 2009/228* (2013.01)

(56) References Cited

U.S. PATENT DOCUMENTS

| | | | |
|---|---|---|---|
| 4,324,643 A | 4/1982 | Durai-Swamy | |
| 9,546,099 B2 * | 1/2017 | Rock | ........................ C02F 1/04 |
| 2014/0071626 A1 * | 3/2014 | Campbell | ............... B23P 15/26 |
| | | | 361/700 |
| 2014/0075978 A1 * | 3/2014 | Sedlak | .................... F25B 39/00 |
| | | | 62/238.7 |
| 2014/0131622 A1 | 5/2014 | Winter et al. | |
| 2016/0130156 A1 * | 5/2016 | Ward | ....................... B01D 1/28 |
| | | | 203/11 |
| 2017/0173493 A1 * | 6/2017 | Damren | ............... B01D 5/0042 |

FOREIGN PATENT DOCUMENTS

| | | |
|---|---|---|
| WO | 2008058137 | 5/2008 |
| WO | 2008110834 | 9/2008 |
| WO | 2010120171 | 10/2010 |

* cited by examiner

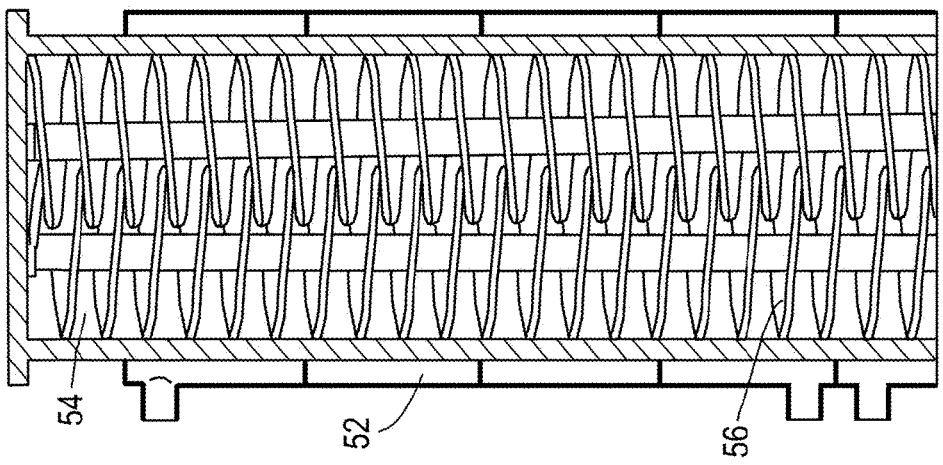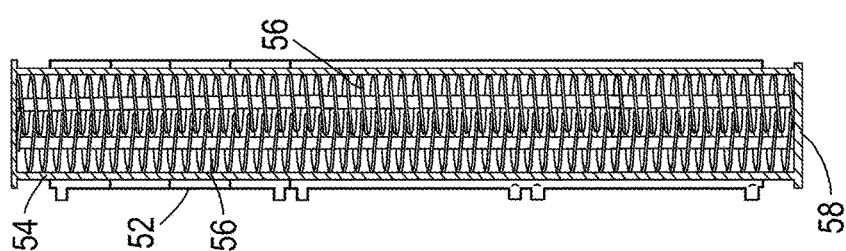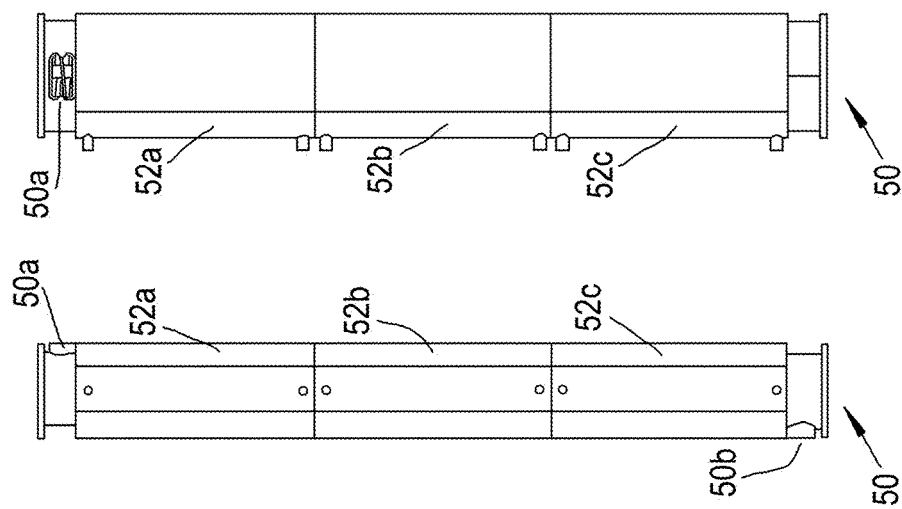

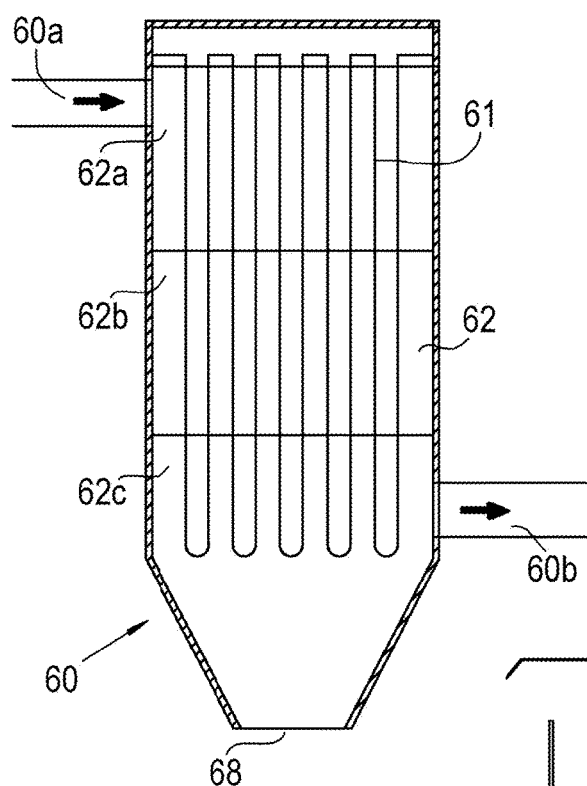
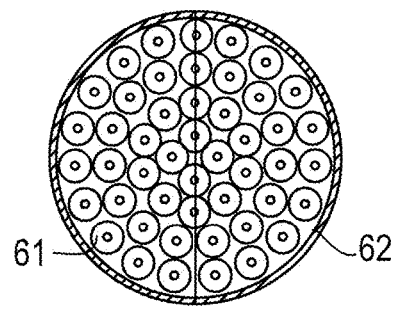
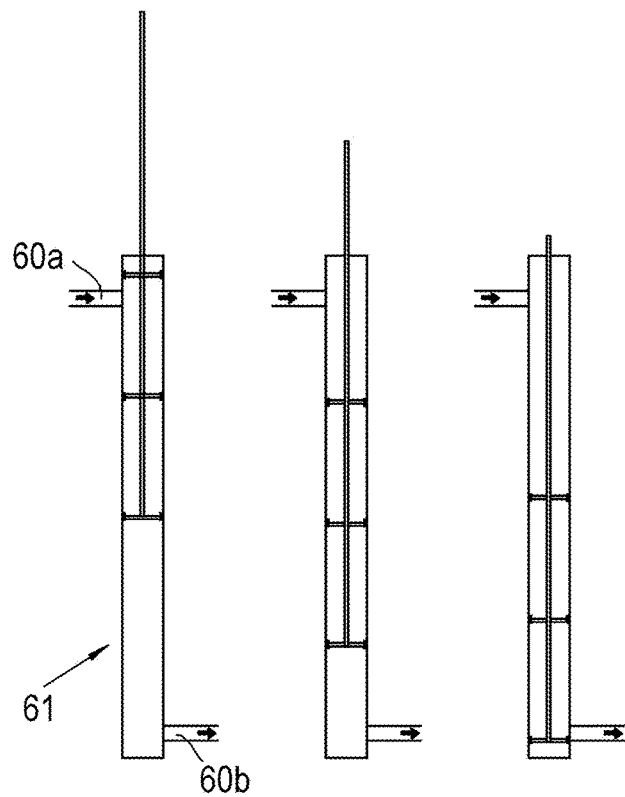

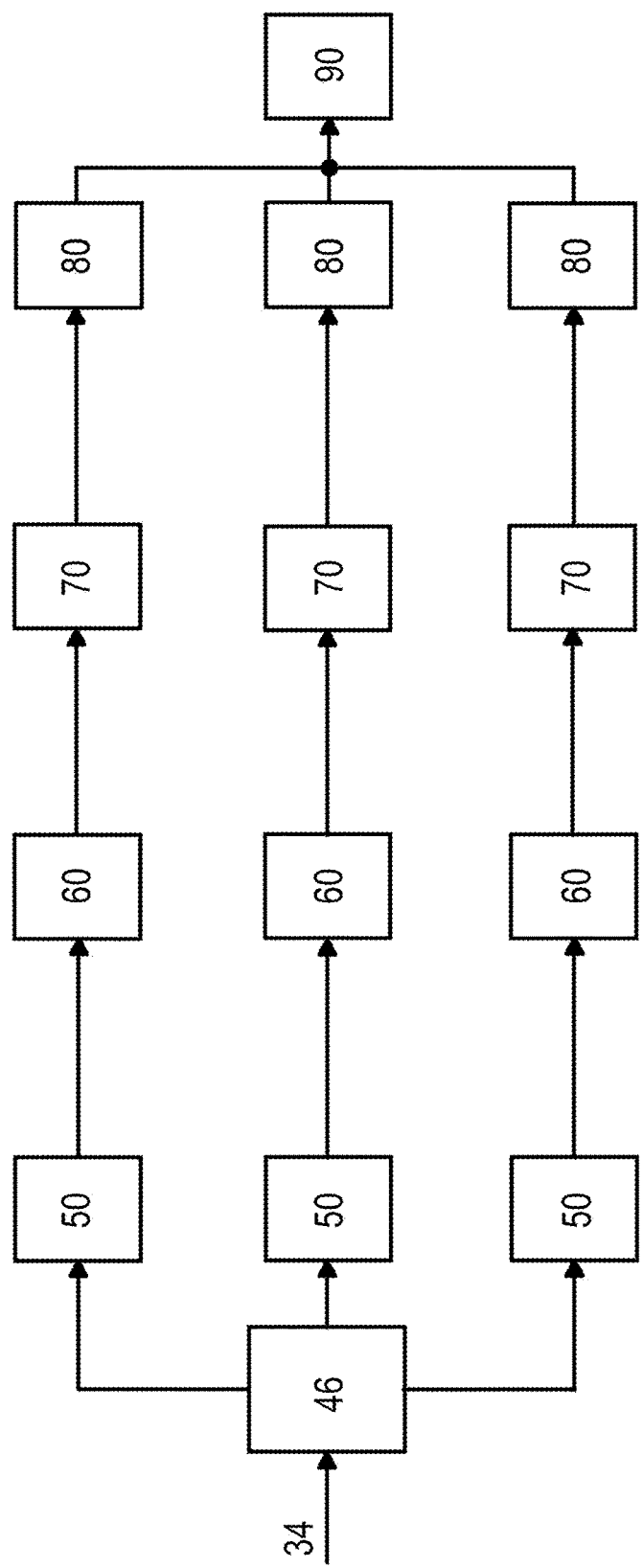

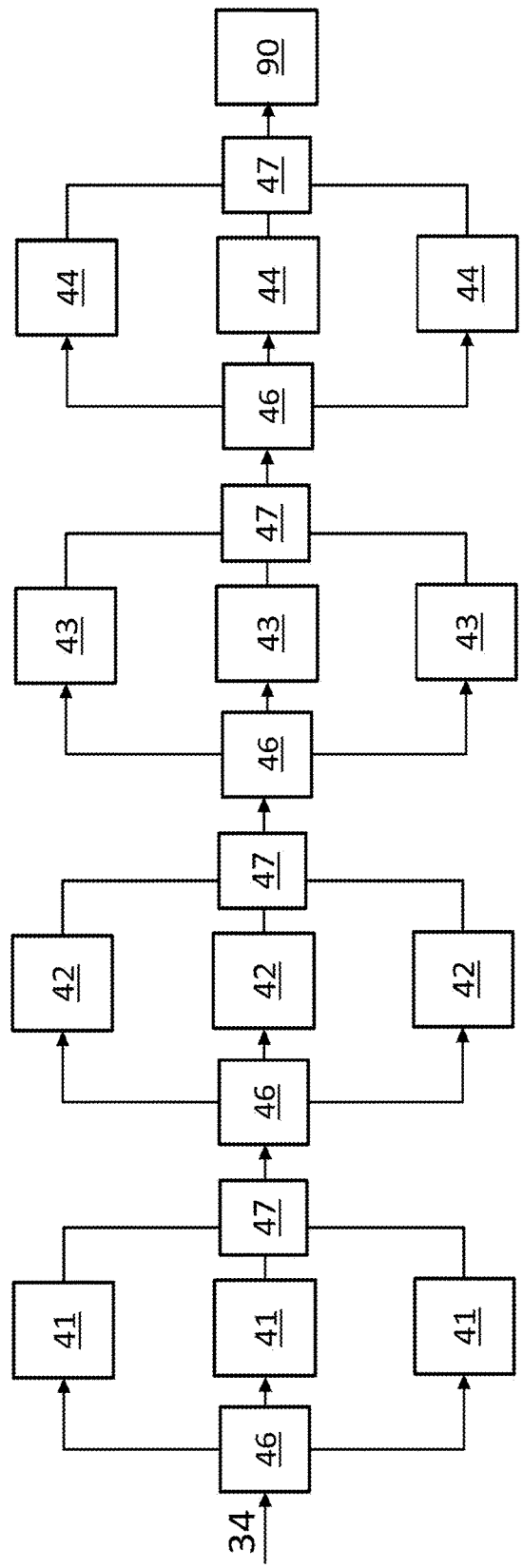

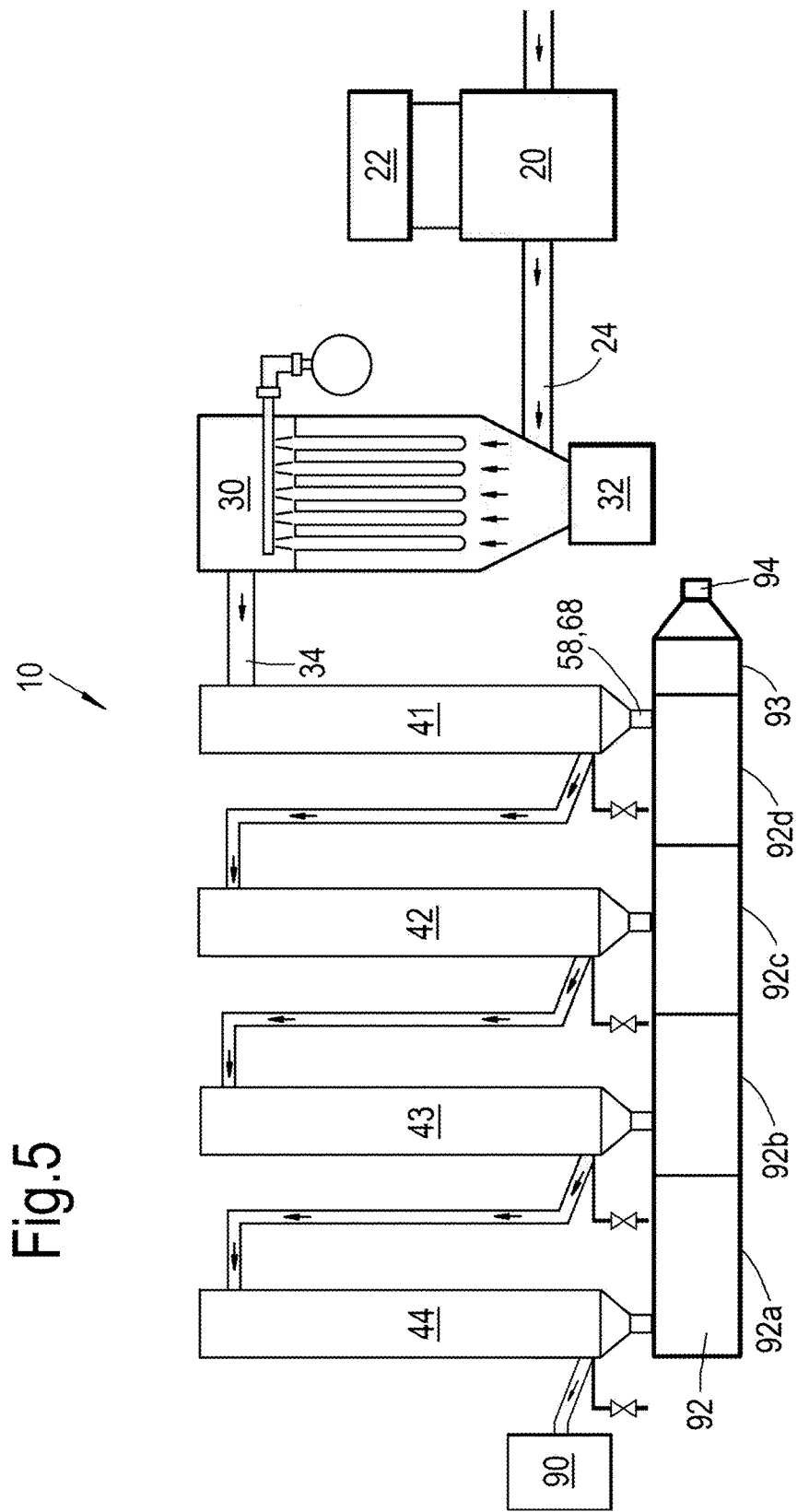

GAS CONDITIONING PROCESS AND SYSTEM FOR EXTRACTING A CONDENSABLE VAPOUR FROM A SUPPLIED GAS

FIELD OF THE INVENTION

The invention relates to the field of gas conditioning and is particularly, although not exclusively, applicable to conditioning gases produced through gasification ("gasification gas").

BACKGROUND

"Gasification gas" is a product of gasification, for example coal gasification and pyrolysis of carbonaceous feeds. In particular, the gas produced by pyrolysing and methanating a biomass feed, i.e. a methane based fuel gas, is considered to be a source of renewable energy and thus it offers a promising solution in achieving carbon neutrality for the processing industries. Furthermore, its high methane content makes it ideal for fueling generators and gas engines where its lean-burn characteristic is favorable for meeting emission requirements.

As gasification process takes place, in some cases, in reaction chambers at an operating temperature of above 750° C., the gas extracted from the chambers often carries vaporised long chain hydrocarbons such as tars, as well as other impurities that need to be stripped from the fuel gas before it can be used. For example, the presence of tars in fuel gas reduces its purity, and in some cases, i.e. gas engine applications, leads to inefficiencies, uncontrolled emissions and internal fouling.

Removal of tars from gasification gas/fuel gas is well known in the art. For example, wet scrubbers are commonly used for removing tars by contacting the gas with a scrubber solution, i.e. water, so that on contact any vaporised tars are condensed and retained in the scrubber solution (see examples given in US20140131622-Winter et al.), resulting in a high purity fuel gas. U.S. Pat. No. 4,324,643 (Durai-Swamy) and U.S. Pat. No. 4,101,412 (Choi) provide some further examples on extracting the tars from the tar-rich scrubber solution, including liquid separation techniques and fractionation columns. The use of wet scrubbers offer a simple solution for gas cleaning, but downstream tar extraction shown in these examples may prove to be expensive and can cause potential harm if the scrubber solutions are not properly treated. Alternatively, the tars may be directly condensed out of the fuel gas without the use of scrubber solution. KR20110137977 (Korean Institute of Energy Research) teaches a centrifugal condenser where fuel gas flowing through a revolving annulus are continuously cooled by the surrounding cooling fluids. On cooling the vaporised tars are condensed out of the fuel gas and flow along an angled wall before leaving the annulus at a liquid exit with the aid of centrifugal force, leaving a stream of conditioned and purified gas to be purged at a gas exit. However processing temperature greatly affects tar viscosity and so inadequate control of the cooling temperature, i.e. overcooling, may lead to thickened tars and thus blockage at the liquid exit, i.e. the centrifugal force imparted by the revolving annulus may not be sufficient to expel the thickened tars out of the revolving annulus.

Tars are long chain hydrocarbons that are the condensable fractions in process gases created by industrial processes. Typically tars with larger molecular weights have higher dew points. These tars typically consist of many aromatic rings for example heavy polyaromatic hydrocarbons. Tars with lower molecular weights, often with fewer aromatic rings, usually have lower dew points. In general tars with higher dew points will have higher viscosities at a specific temperature than those with lower dew points. When in mixture these tars can form a viscous paste which is undesirable and problematic in any gas treatment process. Using the system taught in KR20110137977 for tar removal would inevitably result in great inconsistency in viscosity, which affects heat transfer and drainage performance. For example, in KR20110137977 where the coolant is supplied at a single cooling temperature, the tar mixture containing tars with high dew points significantly thicken the overall mixture, preventing effective draining.

As a result, a gas conditioning unit that is able to efficiently and reliably remove tars from a gasification gas/fuel gas is highly desirable.

SUMMARY

The present applicant has mitigated the above problems by providing a process for removing condensable vapour from a supplied gas, comprising the steps of:

i) cooling the supplied gas at a first condensing surface; wherein said first condensing surface is temperature controlled to a first temperature for condensing a portion of the condensable vapour in the supplied gas, such that the supplied gas is divided into a preliminary condensed fraction and a process gas; while removing the preliminary condensed fraction at the first condensing surface with mechanical scraping means; and ii) cooling the process gas at a second condensing surface; wherein at the second condensing surface is temperature controlled to a second temperature for condensing a further proportion of the remaining condensable vapour in the process gas, such that the process gas is divided into a subsequent condensed fraction and a product gas; while removing the subsequent condensed fraction at the condensing surface with mechanical scraping means;

wherein the preliminary condensed fraction has a higher dew point temperature than the subsequent condensed fraction; and wherein the preliminary condensed fraction has a higher viscosity than the subsequent condensed fraction at any given temperature below the second temperature, and wherein the process further comprises the steps of:

a) collecting the removed subsequent condensed fraction at a first location wherein said first location is temperature controlled to the second temperature; and b) conveying the subsequent condensed fraction mechanically from the first location to a second location; wherein said second location is temperature controlled to the first temperature for heating and/or vaporizing said subsequent condensed fraction to form a heated subsequent fraction; and c) collecting the removed preliminary condensed fraction at the second location; and d) conveying the preliminary condensed fraction and heated subsequent fraction mechanically from the second location to a third location; wherein said third location is temperature controlled to a temperature higher than the first temperature for heating and/or vaporizing said heated subsequent fraction and preliminary condensed fraction to form a concentrated condensable vapour; and e) extracting the concentrated condensable vapour from the third location.

The supplied gas is typically (but not necessarily) a product of coal gasification or pyrolysis of a carbonaceous feeds. Optionally it comprises methane, as well as condensable hydrocarbon vapor, e.g. tar, having a non-gaseous phase at a standard ambient temperature and pressure, i.e. at 25° C. and 1 atm. The supplied gas, at a feed temperature exceeding the dew point of condensable vapour, is typically a well-mixed gas. By including a mechanical scraping means, for example a scraper, the condensed tar may be removed in a timely manner to improve heat transfer at the condensing surface, i.e. it creates a relatively tar-free condensing surface for condensing more vaporised tar. The mechanical scraping means also allows the efficient discharge of tar with higher viscosity, i.e. tar with paste like consistencies; this improves process reliability.

Due to a lowered temperature, the viscosity of the condensed fraction may have risen significantly at the point of removal and thus increases the processing difficulties. As a result, a thermally controlled conveying means may be provided for heating and/or vaporising the condensed fraction to improve its flowability. The condensed fraction may be vapourised to form a concentrated condensable vapor, i.e. a gaseous mixture having a substantially higher tar concentration than the supplied gas.

Step ii) may be repeated at further condensing surfaces using the product gas of the previous step as an input gas. The process can be described as condensing and removing the condensable vapour, or tars, in sequential stages. The mixture of tars removed in each of the stages are of similar dew point and viscosity, and as a result reduces process difficulties. For example, the preliminary fraction has a higher dew point temperature than the subsequent fraction such that the preliminary fraction has a higher viscosity than the subsequent fraction at any given temperature below the second temperature.

Steps c)-d) may be repeated at further locations using a condensed fraction from a further condensing surface and/or the heated condensed fraction of the previous step as input material, in order to form more concentrated condensable vapour. For example, the process may comprises a further location to heat and vapourise any condensed fraction that remains in the liquid phase. The process can therefore be described as heating and vapourising the condensed fractions, in sequential stages, to form a concentrated condensable vapour.

Optionally, the supplied gas is conditioned prior to the condensable vapour removal process. For example, the process may further comprise a step of controlling supplied gas temperature with a supplied gas heat exchanger, as well as a step of filtering with the use of a filter, so that the supplied gas is free from any condensed fractions and particulates.

Optionally, the product gas is scrubbed with the use of a scrubber to remove any outstanding contaminants. And optionally, the scrubbed product gas is dried using a gas dryer so to increase the calorific value of the gas.

Also presented is a system for carrying out the process comprising at least one condensing unit and a thermally controlled conveying means provided for heating and/or vaporizing the at least one condensed fraction removed from the at least one condensing unit to form the concentrated condensable vapour, as such their viscosity may be maintained or reduced to improve flowability; and wherein the thermally controlled conveying means is a heating extruder or a heating scraped surface heat exchanger, or in some cases batch heaters.

The at least one condensing unit comprises the first condensing surface and the second condensing surface, with mechanical scraping means for removing condensed fractions from each condensing surface; each of the first condensing surface and the second condensing surface are individually temperature controlled. Optionally, the condensing unit is an extruder, but it can be any heat exchanger comprising a mechanical scraping means known to the person skilled in the art, for example scraped surface heat exchangers. For example, the system may be a single jacketed extruder wherein the jacket may be sectioned to provide first and second temperatures along its length.

Optionally and alternatively, the system may instead comprise at least two condensing units that are connected; wherein each of the at least two condensing units are individually temperature controlled; in this case a first condensing unit serves as the first condensing surface and a second condensing unit serves as the second condensing surface. Optionally, each of the jackets of the at least two condensing units may further comprise partitions to provide several cooling temperatures to increase flexibility.

The thermally controlled conveying means comprises the first location, second location and third location for heating and vaporising the condensed fraction removed from the each of the condensing units. The first location, second location and third location are sequentially connected; the temperature increases progressively from the first location to the third location. For example the first location, second location and third location may be different sections along a thermally sectioned extruder or scraped surface heat exchanger, or alternatively they can be discreet units in serial connection.

Optionally, the extruder may comprise one or more helical screws for scraping any condensed fraction off the cooled barrels walls, as well as conveying said fractions for removal. Optionally, the extruder may comprise two screws for an increased heat transfer area and enlarged gas flow path, but it may comprise of any number of screws as required. And optionally, the helical screws may comprise a non-stick coating for efficient discharge of condensed fraction from their surface. And optionally, the screws may be temperature controlled for an increased cooling area; for example the screws may be cooled by internal coolant circulation, or with Peltier cooler or any other cooling means.

Optionally, the condensing unit is a scraped surface heat exchanger comprising mechanical scraping means for scraping and conveying the at least one condensed fraction. Optionally, the mechanical scraping means comprises one or more pistons or scraper; wherein the scraped surface heat exchanger comprises a barrel enclosed in a heating/cooling jackets to provide temperature control. For example, the piston or scraper oscillates reciprocally in the axial direction where any condensed tars are scraped and removed at a contacting surface. Optionally, the contacting surfaces between the one or more piston or scraper and the barrel comprising a thermally conductive and hard-wearing coating for protecting said contacting surface; the hard-wearing coating may be boron nitride or any other suitable coatings known to the person skilled in the art.

Optionally, the extruder comprises gas/liquid separation means for separating any entrained preliminary fraction/subsequent fraction from the process gas/product gas; said separation means may be gravity separator, centrifuges, cyclone, filters or any other means known to the person in the art.

BRIEF DESCRIPTION OF THE DRAWINGS

Further features and aspects of the present disclosure will be apparent from the following detailed description of illustrative and non-limitative embodiments, with reference to the drawings, in which:

FIG. 2a-2d depict an extruder as a condensing unit according to an embodiment of the present disclosure.

FIG. 3a-3e depict a scraped surface heat exchanger as a condensing unit according to an embodiment of the present disclosure.

FIGS. 4a and 4b depict two different configuration of condensing module according to another embodiment of the present disclosure.

FIG. 5 depicts a gas conditioning system with tar reheating capability according to a further embodiment of the present disclosure.

DETAILED DESCRIPTION

Figure 1:
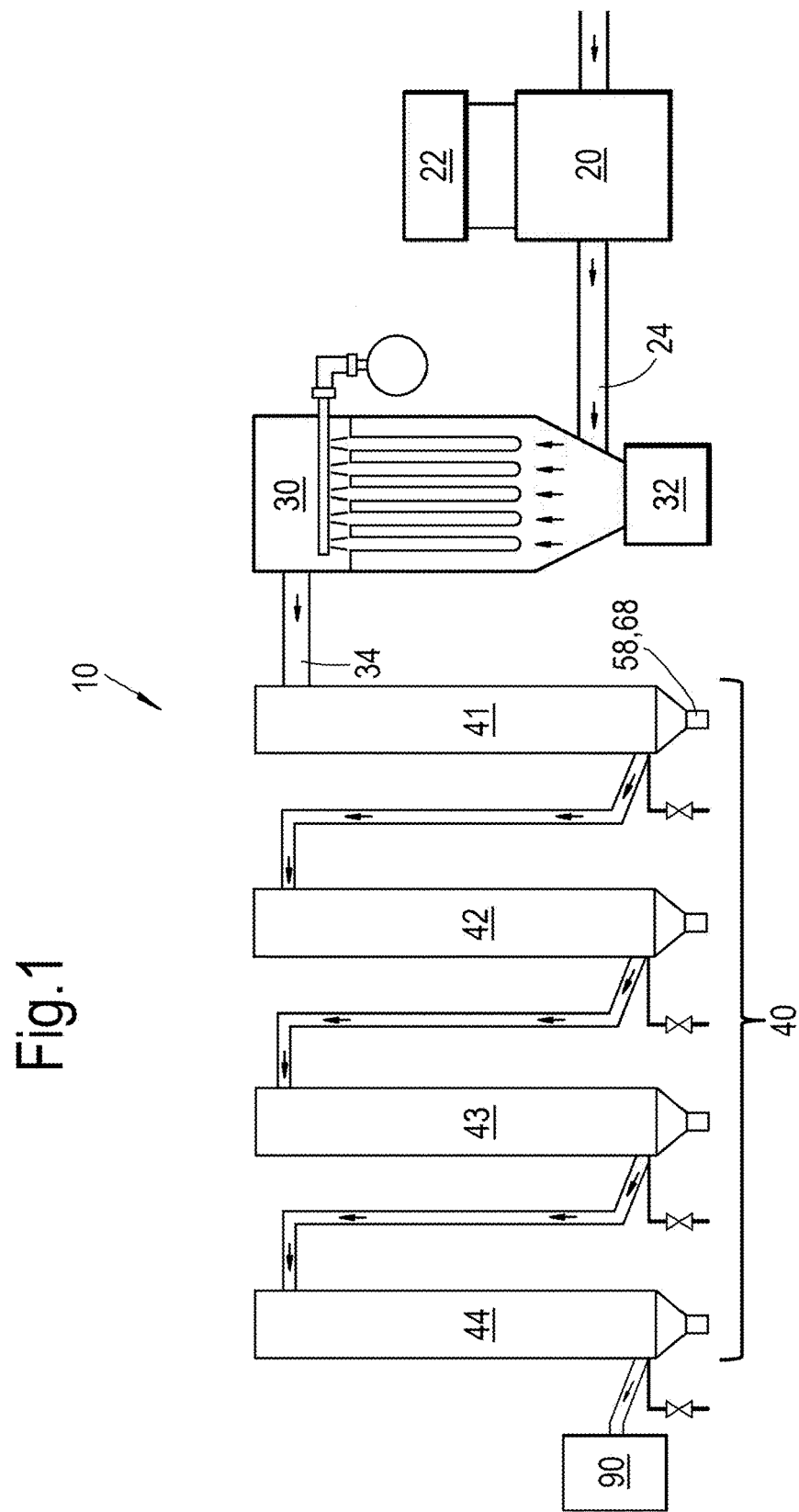
FIG. 1 depicts a gas conditioning system according to an embodiment of the present disclosure.

An embodiment of the gas conditioning system 10 according to the present disclosure is shown in FIG. 1. The gas conditioning system 10 is configured primarily for purifying gasification gas or fuel gas generated by an external pyrolysis process in order to produce a high purity fuel gas ready for use in gas engines or turbines, or as a direct fuel source or any other suitable uses. The gas conditioning system 10 is also suitable for purifying gasification gas or fuel gas produced by other processes such as coal gasification, biomass gasification or even natural gas recovered in the oil and gas industries prior to liquefying.

As shown in FIG. 1, the gas conditioning system 10 comprises a heat exchanger 20 for pre-heating or cooling an incoming fuel gas, a high temperature particulate filter (HTPF) 30 for filtering suspended particulates prior to entering a condenser module 40, where vaporised tars and other heavy hydrocarbons are condensed and stripped from the fuel gas. Finally the purified gas is passed through a scrubbing system 90 to remove any remaining impurities that are not captured by the HTPF 30 and condenser module 40. The product gas, collected at the outlet of the scrubbing system 90, may fuel gas engines and generators directly or it can be pressurised or liquefied for storage and transportation.

The condenser module 40 is scalable, and comprises at least one condensing unit 41. A number of additional units 42,43,44, as shown in the particular embodiment in FIG. 1, may be included. The required number of additional units, as well as their sizes and operating conditions, depend upon the process parameters and the condition of incoming gas, i.e. its throughput and temperature, as well as the tars composition and concentration.

The illustrated example in FIG. 1 features a condenser module 40 configured for extracting tars from a fuel gas produced by a pyrolysis/methanation reactor comprising methane, tars, other non-condensable hydrocarbons, CO, $CO_2$, $H_2$ and other trace gaseous components. The gas stream exits the pyrolysis/methanation reactor at a temperature of approximately 800° C. before passing through a heat exchanger 20 for cooling the gas to approximately 550° C.; the outlet temperature is significantly higher than the dew point of vaporised tars to ensure the majority of tars are kept in a gas phase. The outlet temperature of the heat exchanger 20, however, may be adjusted according to the dew point of the vaporised tars, which varies due to a number of factors such as tars concentration and process pressure.

The heat exchanger 20 further comprises a cooler 22 for dissipating any extracted heat from the passing hot gas. The cooler 22 supplies a flow of coolant to the heat exchanger 20, i.e. chill water, glycol/water mixture or air, or it can be any other suitable coolant or gases. The heat exchanger 20 may be a plate-fin heat exchanger but it can be any non-direct contact heat exchanger known to the person skilled in the art, for example plate heat exchangers and cross flow heat exchangers. For the given example, the inner walls of the heat exchanger, i.e. the gas flow passage, may optionally be constructed with a high nickel content alloy to allow catalytic cracking of tars under the prescribed temperature, i.e. in the range of 550° C. to 800° C. The high nickel content alloy may be Inconel 617, Nickel Alloy 230 or any nickel containing alloy with suitable thermal, catalytic, and anti-corrosive properties.

The cooled gas exiting the heat exchanger, in this case at an approximate temperature of 550° C., passes through the high temperature particulate filtration unit 30 to remove particulate matters suspended within. The HTPF is a ceramic filter but it can be any suitable filter known to the person skilled in the art. The mesh size of the filter depends upon the size of particulate and should not induce a significant pressure drop. The filtration unit 30, along with all the pipelines/ducts featured elsewhere in the gas conditioning unit 10 are adequately insulated to minimise heat loss and thus uncontrolled condensation of tars. Since the gas is kept at a temperature well above the dew point of tars, the filtration unit 30 is prevented from extracting any tars at this stage. The filtration unit 30 may comprise of an automated backflush system where heated product gas is injected to blast on and displace any captured particulates from the filtration unit 30 to a dropout point; said backflush system is a continuous process commonly used within high temperature filtration. The automated backflush system may also comprise a mechanical wiper or any other mechanisms known to the person skilled in the art. The filtered particulate is readily removed at collection point 32 for disposal.

Upon exiting the HTPF 30 the filtered gas 34 enters the condenser module 40, which in the illustrated example in FIG. 1 consists of four serially connected individual condensing units 41,42,43,44. Said condensing units 41,42,43, 44 may be exact replicas of each other, or they may be sized differently according to process conditions. As discussed, tars produced by the pyrolysis process consist of different types of tars all having different dew points and viscosity, and therefore processing all the tars at a uniform temperature would result in processing difficulties. These serially connected condensing units have gradually decreasing gas outlet temperatures, thus together they sequentially cool a passing gas and allow mixtures of tars with similar dew points and flow viscosities to condense and be extracted from a given unit. The number of condensing units required in a condenser module 40 and the outlet temperatures in each of the condensing units depends upon a number of factors, for example gas throughput, pressure, heat transfer efficiencies in condensing units, as well as the tars composition and concentration which in turn relates to the throughput and type of feedstock provided for upstream pyrolysis process. In this particular example, the gas is cooled from 550° C. to 400° C. at the first condenser unit 41, from 400° C. to 250° C. at the second condenser unit 42, from 250° C. to 100° C.

for the third condenser unit 43 and from 100° C. to 60° C. for the final condenser unit 44.

Using the condensing unit 50 in FIG. 2(*a*)-(*d*) as an example, the condensing units 41,42,43,44 may be vertically mounted twin screw extruders enclosed by a cooling jacket 52. However the condensing unit 50 can be any dynamic heat exchanger with mechanical scraping means for the condensed tars, for example, single or multiple screw extruders and scraped surface heat exchangers. In operation, the gas enters the extruder through gas inlet 50*a* where a lowered temperature causes vaporised tars to condense and deposit onto the inner surfaces of the barrel 54. The condensed tars are then mechanically conveyed toward the extraction port 58 at the end of the barrel 54 by the screw flights 56. The gas, with at least a portion of the vaporised tars removed, exits the extruder through gas outlet 50*b*.

Furthermore, the vertical configuration also helps to drain any condensed tars by gravity. The condensed tars are maintained at a fluid and drainable state by controlling the coolant temperature.

The condensing unit 50, as shown in FIG. 2(*c*) and FIG. 2(*d*), contains two shafted self-wiping auger screws 56 where the angle, pitch and rotation speed are determined according to process conditions, to allow sufficient gas/wall contact area, as well as turbulence in the gas flow so to promote heat transfer at the cooling barrel walls, yet to minimise flow resistance that would otherwise lead to pressure drop. In some embodiments, hollow screw shaft and flights are employed for circulating a coolant within; this greatly increases heat transfer area and as a result the condensing unit 50 may be constructed to a more compacted size.

In operation, the screw flights scrapes along the barrel walls, wiping any condensed tars from the surface of barrel walls, as such enhances heat transfer efficiency. Under gravity, the tars are conveyed mechanically towards the extraction port 58 located at the lowest point of the condensing unit 50. In some embodiments, the surface of the screw flights is coated with a formulated non-stick layer stable at the relevant process temperature so that any condensed tars may be drained effectively from the screw flights. Some examples of the formulated non-stick coating are Teflon, enamel coatings, hard chrome or any other technical chromium, ceramic, polymer composite, Electroless Nickel/Polymer composite, thermal spray/polymer composite or any other coatings known the person skilled in the art.

Figure 3D:
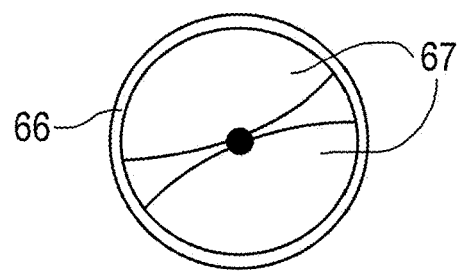
Figure 3E:
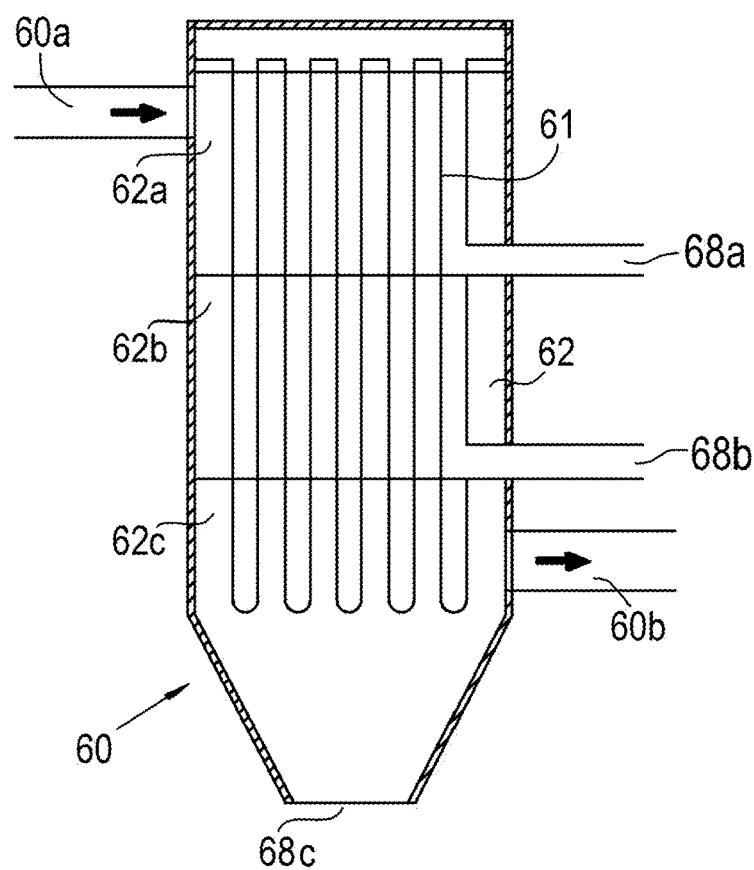

Alternatively, condensing module 40 may additionally comprise vertically mounted scraped surface heat exchangers (SSHE) 60, for example HRS Unicus Series SSHE, as shown in FIG. 3(*a*)-FIG. 3(*d*). The illustrated examples are essentially shell and tube heat exchangers with internal scraping mechanisms; they are interchangeable with the extruder shown in FIG. 2(*a*)-(*d*), i.e. the serially connected condensing units 41,42,43,44 may be a combination of SSHE 60 and extruders 50. It comprises a cooling jacket 62 to provide temperature control for at least one heat exchanger tube 61; the example shown in FIGS. 3(*a*) and 3(*b*) comprises multiple tubes 61 bundled together where a uniform cooling temperature is imposed upon the many tubes 61. In use hot gas is cooled as it passes through the tube 61, as such vapourised tars may condense onto the internal surfaces of the tube wall before they are drained towards the extraction port 68. At least one scraper is provided to aid tars removal. For example as shown in FIG. 3(*d*), the scraper may be ring shaped plunger oscillating reciprocally in the axial direction, or it can be any mechanically conveying means known to the person skilled in the art such as pistons and brushes. In operation, the tars deposited on the tube walls are scraped off by the scraper and together with the gas flow, they drain downwardly through the plunger opening 67 as shown in FIG. 3(*d*); as a result, the tars-free tube walls may then provide a condensing surface with an improved heat transfer efficiency, consequently enabling more tars to be condensed in a given unit. In addition, the oscillating movement of the scrapers also induces turbulence in the gas flow to promote mass and heat transfer. In the given example as shown in the animation of FIG. 3(*c*), there are three co-axial plungers 66 featured in a single tube 61 driven by a common shaft; however the number of plungers 66 to be installed in a single tube 61 depends upon process condition and tars viscosities. Furthermore, the travel of each of the plungers 66 in a reciprocal cycle, i.e. the reach of a particular plunger 66, is equal to or more than the separation between two adjacent plungers 66 to ensure that the entire length of the tube 61 is thoroughly scraped, as demonstrated in the animation of FIG. 3(*c*).

In the case of a SSHE equipped with multiple tubes 61, such as that shown in FIG. 3(*a*), the incoming gas is first split into portions before being fed into each of the individual tubes using a gas manifold. Furthermore, a linkage mechanism may be provided to mechanically connect all the shafts in each of the multiple tubes 61 so that all the plungers in the SSHE are oscillating in synchronisation with each other.

To ensure effective tars scraping, the ring-shaped plungers 66 are substantially in contact with the walls of the tube 61. Even though the condensed tars may act as a lubricant, a high level of wear is expected at the contacting surfaces between the tube walls and the pistons 66. Therefore said contacting surfaces are optionally coated with thermally conductive hard wearing coatings, for example boron-nitride, for enhancing durability and prolonging lifetime of the moveable parts.

Optionally, the cooling jacket 52,62 shown in FIG. 2 (*a*)-(*b*) and FIG. 3 (*a*) may be further divided into different temperature controlled zones 52*a,b,c*, 62*a,b,c*, by partitioning different sections of the cooling jacket for circulating coolant at different temperatures. This effects a more reactive and precise temperature control along the length of the barrel, due to narrower temperature brackets in each of the temperature controlled zones; it also gives flexibility to account for fluctuations in gas flow and tar conditions.

Liquid extraction points may be provided at the end of each of the temperature controlled zones in a single condensing unit; timely removal of tar by way of temperature control ensures any condensed tars do not gain viscosity along the barrel by promptly removing the tars from the cooling process. Furthermore, using the SSHE 60 in FIG. 3(*e*) as an example but equally applicable to the twin screw extruder 50, the inclusion of multiple extraction ports 68*a*, 68*b*,68*c* in a single condensing unit, each having a corresponding temperature controlled zones 62*a*,62*b*,62*c* with individual cooling controls, removes the need for multiple condensing units. For example in the case where the gas throughput is reduced, gas conditioning can instead be carried out using only the first condensing unit 41 equipped with the aforementioned multiple temperature controlled zones and liquid extraction points; the purified gas at the exit of the first condensing unit 41 may bypass the subsequent condensing units 42,43,44 and be fed directly to the downstream scrubber 90.

Each of the condensing units 41,42,43,44 comprises a gas/liquid separator for separating any entrained tar droplets from the cooled gas stream. The gas/liquid separator, located at the gas outlet 50b,60b is a gravity separator but it can be any gas/liquid separator known to the person skilled in the art, for example cyclone separator and filters. Any entrained tars, collected by the gas/liquid separator, join the down flowing tars removed by the mechanical scraping means, i.e. the screw 56 or scraper 66; together the tars drained at the extraction port 58,68, which comprises a liquid flow control device for control extraction of tars from the condensing unit 50,60. For example, if a pool of tar is allowed to accumulate at the bottom of condensing unit 50,60 it forms a natural gas barrier for preventing gas leakage through the extraction port 58,68. The liquid flow control device may be one way valves, rotary valves, positive displacement pumps, screw extruders, or any other suitable flow control devices suitable for providing one way passage for outgoing tars and a gas seal, which may be collected for further processing or for disposal.

Multiple condensing units operating at the same coolant temperature may be connected in parallel in order to process an elevated overall gas throughput. As such the gas/wall contacting area for a given quantity of gas flow is maintained. For example, as shown in FIG. 4(a) and FIG. 4(b), the filtered gas flow 34 may be divided into several minor gas streams using a gas manifold system 46 before feeding the said minor gas streams to multiple first condensing units 41 that are parallel connected; the cooled gas exiting the multiple first condensing units 41 may first be fed directly to connecting multiple second condensing units 42 as shown in FIG. 4(a); or they can be recombined in a buffer tank 47 for pressure balancing before being fed into multiple second condensing units 42 through yet another gas manifold system, as shown in FIG. 4(b). Similar arrangements can be implemented for the third condensing units 43 and the final condensing units 44.

Since the cooling temperature at the final condensing unit 44 may be as low as ambient temperature, or in some cases lower than the ambient temperature, it is expected that most of the water vapour will be condensed along with any outstanding vapourised tars. Therefore optionally, a sensor may be included at the extraction outlet of the final condensing unit 44 for monitoring the moisture levels in the condensed tars. Depending on its moisture content, the extracted liquids from the final condensing unit 44 may be disposed of or processed separately from the tars extracted in preceding condensing units 41,42,43, The cooled gas at the exit of final condensing unit 44 is passed into scrubbing system 90 to remove any uncondensed aromatic hydrocarbons, HCl, ammonia, $H_2S$ or any other gaseous impurities. The scrubbing system 90 may comprise any or a combination of the water scrubber, oil scrubber, caustic scrubber, or any other gas scrubbing systems known to the person skilled in the art. Subsequently the product gas is then dehydrated using a desiccant or any other suitable means before it is compressed and stored, or it can be used directly to fuel downstream users such as generators or engines.

The extracted tars contain a high calorific value which can be cracked and reformed into other forms of fuel via further pyrolysis, gasification, combustion or to be used as a process commodity. In a second embodiment according to the present invention, as shown in FIG. 5, the tars condensed in each of the condensing units in the condensing module 40 are drained into to a thermally zoned conveying means 92 similar to the condensing units 41, for example a twin screw extruder 50 or a SSHE 60, in order to heat and vaporise the condensed tars for further processing. The thermally zoned twin screw extruder 92 as illustrated in FIG. 5 comprises temperature zones each corresponding to a condensing unit 41,42,43,44; for example the temperature progressively increases from 92a to 92d. In the illustrated example the temperatures in zone 92a, 92b, 92c, 92d are 60° C., 100° C., 250° C., 400° C. respectively, corresponding to the tars outlet temperature in each of the connecting condensing units. The flow of conveyed tars follow the increasing temperature gradient from 92a to 92d towards final thermally controlled zone 93 and extraction point 94. This ensures the tars collected in each of the thermally controlled zones are in a fluid state for conveying into the subsequent zones; due to the higher temperature in said subsequent zones they can vaporise. This will enable efficient conveying of tars, in either liquid or gaseous phase, to a final thermally controlled zone 93 to ensure all tars are vaporised prior to the extraction point 94 for further processing. In this embodiment, the additional thermally controlled zone 93 is temperature controlled to 550° C., similar to the temperature of the filtered gas 34. Reheating the condensed tars has many advantages. For example, as a gas, the flow of tars may be driven by pressure difference alone and minimises process difficulties that may otherwise encountered in liquid tars. In addition, introducing heated and vaporised tar into pyrolysis and methanation reaction chambers aids process stability as it avoids undue temperature drop in said chambers. In some embodiments, a portion of fuel gas exiting a prior pyrolysis process, i.e. at a temperature of >800° C., may be utilised as the heat source at extruder 92 for vaporising condensed tars; as such reducing the cooling duty of heat exchanger 20.

Furthermore, since the condensing temperature at the final condensing unit 44, in some embodiments, may be at or lower than the ambient temperature, a large quantity of water vapour in the gas may condense and be drained along with the tars from the final condensing unit; in cases where water ingress is detrimental, i.e. combustion process, or the measured moisture content is excessive, the condensed tars stream in the final condensing unit 44 may be discarded instead of feeding into the thermally zoned twin screw extruder 92.

The invention claimed is:

1. A process for extracting a condensable vapour from a supplied gas, comprising the steps of:
   i) cooling the supplied gas at a first condensing surface; wherein said first condensing surface is temperature controlled to a first temperature for condensing a portion of the condensable vapour in the supplied gas, such that the supplied gas is divided into a preliminary condensed fraction and a process gas; while removing the preliminary condensed fraction at the first condensing surface with mechanical scraping means; and
   ii) cooling the process gas at a second condensing surface; Wherein at the second condensing surface is temperature controlled to a second temperature for condensing a further proportion of the remaining condensable vapour in the process gas, such that the process gas is divided into a subsequent condensed fraction and a product gas; while removing the subsequent condensed fraction at the condensing surface with mechanical scraping means;
   wherein the preliminary condensed fraction has a higher dew point temperature than the subsequent condensed fraction; and wherein the preliminary condensed fraction has a higher viscosity than the subsequent condensed fraction at any given temperature below the second temperature, and wherein the process further comprises the steps of:

a) collecting the removed subsequent condensed fraction at a first location wherein said first location is temperature controlled to the second temperature; and
b) conveying the subsequent condensed fraction mechanically from the first location to a second location; wherein said second location is temperature controlled to the first temperature for heating and/or vaporizing said subsequent condensed fraction to form a heated subsequent fraction; and
c) collecting the removed preliminary condensed fraction at the second location; and
d) conveying the preliminary condensed fraction and heated subsequent fraction mechanically from the second location to a third location; wherein said third location is temperature controlled to a temperature higher than the first temperature for heating and/or vaporizing said heated subsequent fraction and preliminary condensed fraction to form a concentrated condensable vapour; and
e) extracting the concentrated condensable vapour from the third location.

2. The process as claimed in claim 1, wherein the supplied gas is a product of coal gasification or pyrolysis of a carbonaceous feed; and wherein the condensable vapor comprises hydrocarbon which has a nongaseous phase at a standard ambient temperature of 25° C. and pressure of 1 atm.

3. The process as claimed in claim 2, wherein the supplied gas comprises methane; and wherein the condensable vapor comprises tars.

4. The process as claimed in claim 1, further comprising a step of controlling supplied gas temperature with a supplied gas heat exchanger prior to the step of cooling the supplied gas; wherein the supplied gas prior to the cooling step is substantially free from the at least one condensed fraction.

5. The process as claimed in claim 1, further comprising a step of filtering supplied gas with a filter prior to the step of cooling said supplied gas.

6. The process as claimed in claim 1, further comprising a step of scrubbing the product gas with a scrubber; wherein the scrubbed product gas is subsequently dried using a gas dryer.

7. The process as claimed in claim 1, wherein step ii) is repeated at further condensing surfaces using the product gas of the previous step as an input gas, and steps c)-d) are repeated at further locations using a condensed fraction a further condensing surfaces and/or the heated condensed fraction of the previous step as input material.

8. A gas conditioning system for carrying out the process as claimed in claim 1, comprising at least one condensing unit, wherein a thermally controlled conveying means is provided for heating and/or vaporizing the preliminary condensed fraction and subsequent condensed fraction removed from the at least one condensing unit to form the concentrated condensable vapour; wherein the thermally controlled conveying means is a heating extruder or a heating scraped surface heat exchanger; wherein the condensing unit comprises the first condensing surface, mechanical scraping means for removing condensed fractions from the first condensing surface, the second condensing surface, and mechanical scraping means for removing condensed fractions from the second condensing surface; wherein each of the first condensing surface and the second condensing surface are individually temperature controlled; wherein the thermally controlled conveying means comprises the first location, second location and third location for heating and vaporising the condensed fraction removed from the at least one condensing unit; where the first location, second location and third location are sequentially connected; and wherein the temperature increases progressively from the first location to the third location.

9. The gas conditioning system as claimed in claim 8 comprising at least two condensing units; wherein the at least two condensing units comprise a first condensing unit as the first condensing surface and a second condensing unit as the second condensing surface.

10. The gas conditioning system as claimed in claim 9, wherein the at least two condensing units are serially connected; and wherein each of the at least two condensing units are individually temperature controlled.

11. The gas conditioning system as claimed in claim 8, wherein the condensing unit is an extruder comprising mechanical scraping means for conveying and removing the preliminary condensed fraction and subsequent condensed fraction from the condensing surface.

12. The gas conditioning system as claimed in claim 11, wherein the mechanical scraping means is helical screws; wherein said extruder comprises heating/cooling jackets to provide temperature control.

13. The gas conditioning system as claimed in claim 12, wherein the helical screws comprising a nonstick coating for efficient discharge of the preliminary condensed fraction and subsequent condensed fraction from the helical screws.

14. The gas conditioning system as claimed in claim 8, wherein the condensing unit is a scraped surface heat exchanger comprising mechanical scraping means for conveying and removing the preliminary condensed fraction and subsequent condensed fraction from the condensing surface.

15. The gas conditioning system as claimed in claim 14, wherein the mechanical scraping means comprises one or more piston or scraper; wherein the scraped surface heat exchanger comprises a barrel enclosed in a heating/cooling jackets to provide temperature control.

16. The gas conditioning system as claimed in claim 15, wherein the contacting surfaces between the one or more piston or scraper and the barrel comprising a hard-wearing coating for protecting said contacting surface.

17. The gas conditioning system as claimed in claim 16, wherein the hard-wearing coating is boron-nitride.

18. The gas conditioning system as claimed in claim 8, wherein the condensing unit comprises gas/liquid separation means for separating any condensed fraction from gas.

19. A process for extracting a condensable vapour from a supplied gas, comprising the steps of:
   i) cooling the supplied gas at a first condensing surface; wherein said first condensing surface is temperature controlled to a first temperature for condensing a portion of the condensable vapour in the supplied gas, such that the supplied gas is divided into a preliminary condensed fraction and a process gas; while removing the preliminary condensed fraction at the first condensing surface with mechanical scraping means; and
   ii) cooling the process gas at a second condensing surface; wherein at the second condensing surface is temperature controlled to a second temperature for condensing a further proportion of the remaining condensable vapour in the process gas, such that the process gas is divided into a subsequent condensed fraction and a product gas; while removing the subsequent condensed fraction at the condensing surface with mechanical scraping means;

wherein the preliminary condensed fraction has a higher dew point temperature than the subsequent condensed fraction; and wherein the preliminary condensed fraction has a higher viscosity than the subsequent condensed fraction at any given temperature below the second temperature, and wherein the process further comprises the steps of:
a) collecting the removed subsequent condensed fraction at a first location wherein said first location is temperature controlled to at least the
second temperature; and b) collecting the removed preliminary condensed fraction at the second location; wherein said second location is temperature controlled to at least the first temperature.

20. The process as claimed in claim 19, wherein the supplied gas is a product of coal gasification or pyrolysis of a carbonaceous feed; and wherein the condensable vapor comprises hydrocarbon which has a non-gaseous phase at a standard ambient temperature of 25° C. and pressure of 1 atm.

21. The process as claimed in claim 20, wherein the supplied gas comprises methane; and wherein the condensable vapor comprises tars.

22. The process as claimed in claim 19, further comprising a step of filtering supplied gas with a filter prior to the step of cooling said supplied gas.

23. The process as claimed in claim 19, wherein step ii) is repeated at further condensing surfaces using the product gas of the previous step as an input gas, and step b) is repeated at further locations using fractions condensed at the further condensing surfaces as input material.

24. A gas conditioning system for carrying out the process as claimed in claim 19, comprising at least one condensing unit, a first location, and a second location; wherein the condensing unit comprises the first condensing surface, mechanical scraping means for removing condensed fractions from the first condensing surface, the second condensing surface, and mechanical scraping means for removing condensed fractions from the second condensing surface; wherein each of the first condensing surface and the second condensing surface are individually temperature controlled; wherein the first location is adapted to receive condensed fractions from the second condensing surface and temperature controlled to the same temperature as the second condensing surface or higher; wherein the second location is adapted to receive condensed fractions from the first condensing surface and temperature controlled to the same temperature as the first condensing surface or higher.

25. The gas conditioning system as claimed in claim 24 comprising at least two condensing units; wherein the at least two condensing units comprise a first condensing unit as the first condensing surface and a second condensing unit as the second condensing surface.

26. The gas conditioning system as claimed in claim 25, wherein the at least two condensing units are serially connected; and wherein each of the at least two condensing units are individually temperature controlled.

27. The gas conditioning system as claimed in claim 24, wherein the condensing unit is a scraped surface heat exchanger comprising mechanical scraping means for conveying and removing the preliminary condensed fraction and subsequent condensed fraction from the condensing surface.

28. The gas conditioning system as claimed in claim 27, wherein the mechanical scraping means comprises one or more piston or scraper; wherein the scraped surface heat exchanger comprises a barrel enclosed in a heating/cooling jackets to provide temperature control.

* * * * *